United States Patent
Scandle et al.

(10) Patent No.: US 12,249,254 B2
(45) Date of Patent: Mar. 11, 2025

(54) PROGRAMMABLE INTERFACE FOR FLIGHT CONTROL DEVICES

(71) Applicant: THE BOEING COMPANY, Chicago, IL (US)

(72) Inventors: Joseph J. Scandle, Morton, PA (US); Paul Lee Redkoles, Mullica Hill, PA (US); Michael Senoyuit, IV, Perkasie, PA (US)

(73) Assignee: THE BOEING COMPANY, Arlington, VA (US)

( * ) Notice: Subject to any disclaimer, the term of this patent is extended or adjusted under 35 U.S.C. 154(b) by 599 days.

(21) Appl. No.: 17/647,245

(22) Filed: Jan. 6, 2022

(65) Prior Publication Data

US 2023/0215286 A1 Jul. 6, 2023

(51) Int. Cl.
G09B 9/08 (2006.01)
G09B 9/30 (2006.01)
G09B 9/46 (2006.01)

(52) U.S. Cl.
CPC ............. G09B 9/302 (2013.01); G09B 9/46 (2013.01)

(58) Field of Classification Search
CPC ... G09B 9/08; G09B 9/16; G09B 9/24; G09B 9/28; G09B 9/30
See application file for complete search history.

(56) References Cited

U.S. PATENT DOCUMENTS

| | | | | |
|---|---|---|---|---|
| 4,787,024 A | * | 11/1988 | Allsop | G09B 9/16 434/30 |
| 5,017,141 A | * | 5/1991 | Relf | G09B 9/08 434/350 |
| 5,616,030 A | * | 4/1997 | Watson | G09B 9/44 434/30 |
| 5,632,622 A | * | 5/1997 | Bothwell | G09B 9/165 434/30 |
| 6,109,920 A | * | 8/2000 | Shih | G09B 9/08 434/37 |

(Continued)

OTHER PUBLICATIONS

"Mini Proportional Output Thumbwheel" HTWM Miniature Thumbwheel, Otto Full Line Catalog, www.ottoexcellence.com, pp. 85-87.

(Continued)

*Primary Examiner* — Kurt Fernstrom
(74) *Attorney, Agent, or Firm* — Moore IP Law (57) ABSTRACT

A rotorcraft flight simulator system includes physical flight control devices for a rotorcraft vehicle. Each of the flight control devices is configured to generate, when actuated, one or more control signals via an output connector of that flight control device. The system includes a programmable interface with multiple input pins, and each of the output connectors is coupled to a respective input pin. The programmable interface includes a controller configured to attribute particular control signals received at a particular input pin to a specific flight control device. The system includes a flight simulator computer configured to receive output signals from the controller via an Ethernet port. The output signals include, for the specific flight control device, header information indicating the specific flight control device and flight control data corresponding to a particular control signal received at the particular input pin that is associated with the specific flight control device.

20 Claims, 5 Drawing Sheets

(56) References Cited

U.S. PATENT DOCUMENTS

| | | | |
|---|---|---|---|
| 7,107,196 B2* | 9/2006 | Waterston | G09B 9/00 348/211.7 |
| 7,801,714 B2* | 9/2010 | Villey | G09B 9/08 703/7 |
| 2020/0286399 A1 | 9/2020 | Redkoles | |

OTHER PUBLICATIONS

Anonymous, "Arduino Parts for Avionics and Cockpit Controls," May 30, 2021, retrieved from internet: https://forums.flightsimulator.com/t/arduino-parts-for-avionics-and-cockpit-controls/389219/2, pp. 1-4.

Anonymous, "Flightsim-Avionics-Panel," Apr. 10, 2021, retrieved from internet: http://simandit.de/simwiki/doku.php?id=weiteres:arduino:flightsim_panel, pp. 1-6.

Extended European Search Report for Application No. 22203928.1 dated Jun. 7, 2023, 8 pgs.

* cited by examiner

PROGRAMMABLE INTERFACE FOR FLIGHT CONTROL DEVICES

FIELD OF THE DISCLOSURE

The present disclosure is generally related to interfaces to couple flight control devices to a flight simulation system or avionics hardware.

BACKGROUND

Flight simulators may include large static installations of aircraft cockpits, with flight controls, displays, instrumentation and other pilot interfaces, and out-the-window (OTW) displays. In some instances the aircraft cockpits include high-fidelity simulated hardware or actual flight hardware integrated into the flight simulation. Such hardware may include, for example, tactical displays, multifunction displays (MFDs), instrumentation, alert and warning indicators, heads-up displays (HUDs), flight controls, communication systems, and other avionics systems. Likewise, some flight simulators include high-fidelity OTW display systems including, for example, curved-screen projection systems, multi-panel display systems, or dome projection systems. High-fidelity flight simulators enable training, testing, and marketing of complex aircraft without the expense of actual flight time in actual aircraft, although such flight simulators are generally dedicated to a particular aircraft.

Flight simulators, both static and mobile, generally include at least one processing system, e.g., a computer, that executes flight simulation software for controlling various pilot interfaces, including, for example, flight controls and various displays. Many high-fidelity flight simulators include multiple processing systems respectively dedicated to controlling one or more subsystems of the flight simulator. The flight simulation software may coordinate among all other simulation processes, whether they are executed on a single processing system or distributed among multiple processing systems. The flight simulator software may include, for example, a math model that processes various inputs, such as, for example, flight control inputs and wind, to compute various outputs, or aircraft parameters, such as aircraft attitude (e.g., pitch, roll, and yaw), that represent the dynamics of the aircraft in simulated flight.

The effectiveness of a flight simulator is enhanced by mimicking the simulated aircraft as closely as possible, including the aircraft performance and also the flight controls used by the pilot. However, since different aircraft use different combinations of flight controls in various configurations, providing in a flight simulator the same flight controls that are used in an actual aircraft requires a customized installation process for each aircraft to be simulated, which is time-consuming and expensive.

SUMMARY

In a particular implementation, a rotorcraft flight simulator system includes physical flight control devices for a rotorcraft vehicle. Each of the physical flight control devices includes a respective output connector and is configured to generate, when actuated, one or more control signals via the output connector of that flight control device. The rotorcraft flight simulator system includes a programmable interface that includes multiple input pins. Each of the output connectors of the flight control devices is coupled to a respective input pin of the multiple input pins to communicate the respective control signals from the flight control devices to the respective input pins. The programmable interface also includes a controller configured to attribute particular control signals received at a particular input pin of the multiple input pins to a specific flight control device of the flight control devices. The rotorcraft flight simulator system also includes a flight simulator computer configured to receive output signals from the controller via an Ethernet port. The output signals include one or more sets of information associated with the control signals. The one or more sets of information include, for the specific flight control device, header information indicating the specific flight control device, and flight control data corresponding to a particular control signal received at the particular input pin, of the multiple input pins, that is associated with the specific flight control device.

In another particular implementation, a microcontroller device includes multiple input pins configured to be coupled to respective output connectors, of multiple physical flight control devices for a particular rotorcraft vehicle, to receive one or more control signals from the flight control devices at respective input pins. The microcontroller device also includes an Ethernet port and a controller. The controller is configured to attribute particular control signals received at a particular input pin of the multiple input pins to a specific flight control device of the flight control devices, and to generate output signals including one or more sets of information associated with the one or more control signals. The one or more sets of information include, for the particular control signals associated with the specific flight control device, header information indicating the specific flight control device, and flight control data corresponding to a particular control signal received at the particular input pin, of the multiple input pins, that is associated with the specific flight control device. The controller is also configured to output the output signals via the Ethernet port.

In another particular implementation, a method of using a rotorcraft flight simulator system includes receiving, at multiple input pins of a microcontroller device that are coupled to respective output connectors of multiple physical flight control devices for a particular rotorcraft vehicle, one or more control signals from the flight control devices. The method includes attributing, at the microcontroller device, a particular control signal received at a particular input pin of the multiple input pins to a specific flight control device of the flight control devices. The method includes generating output signals including one or more sets of information associated with the one or more control signals. The one or more sets of information include, for the particular control signal associated with the specific flight control device, header information indicating the specific flight control device, and flight control data corresponding to the particular control signal received at the particular input pin associated with the specific flight control device. The method also includes sending the output signals, via an Ethernet port of the microcontroller device, to a flight simulator computer.

The features, functions, and advantages described herein can be achieved independently in various implementations or may be combined in yet other implementations, further details of which can be found with reference to the following description and drawings.

DETAILED DESCRIPTION

Aspects disclosed herein present systems and methods for a programmable flight control interface. Conventionally, providing the same flight controls in a flight simulator that are used in an actual aircraft, such as a particular rotorcraft vehicle, requires a time-consuming and expensive custom installation process for each rotorcraft vehicle to be simulated. By using a programmable flight control interface, various physical flight control devices can be added or removed from a flight simulator system with reduced delay and expense.

According to some aspects, the programmable flight control interface includes a microcontroller device that can receive discrete and analog control signals from various flight control devices. The programmable flight control interface converts the received control signals into flight control data that is output to a flight simulator computer, such as via an Ethernet message. The programmable flight control interface can identify which flight control generated which control signal based on a pin-to-flight-control-device mapping for the particular rotorcraft being simulated and can perform control signal translations into a format expected by the flight simulation computer (or a mission computer) based on programmable settings. The programmable flight control interface can therefore be efficiently updated to accommodate various types and configurations of flight control devices corresponding to different rotorcraft, enabling efficient rapid prototyping and improving the flexibility of a flight simulator system to simulate a variety of different rotorcraft.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple flight control devices 110 are illustrated and associated with reference numbers 110A and 110B. When referring to a particular one of these flight control devices, such as a first flight control device 110A, the distinguishing letter "A" is used. However, when referring to any arbitrary one of these flight control devices or these flight control devices as a group, the reference number 110 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
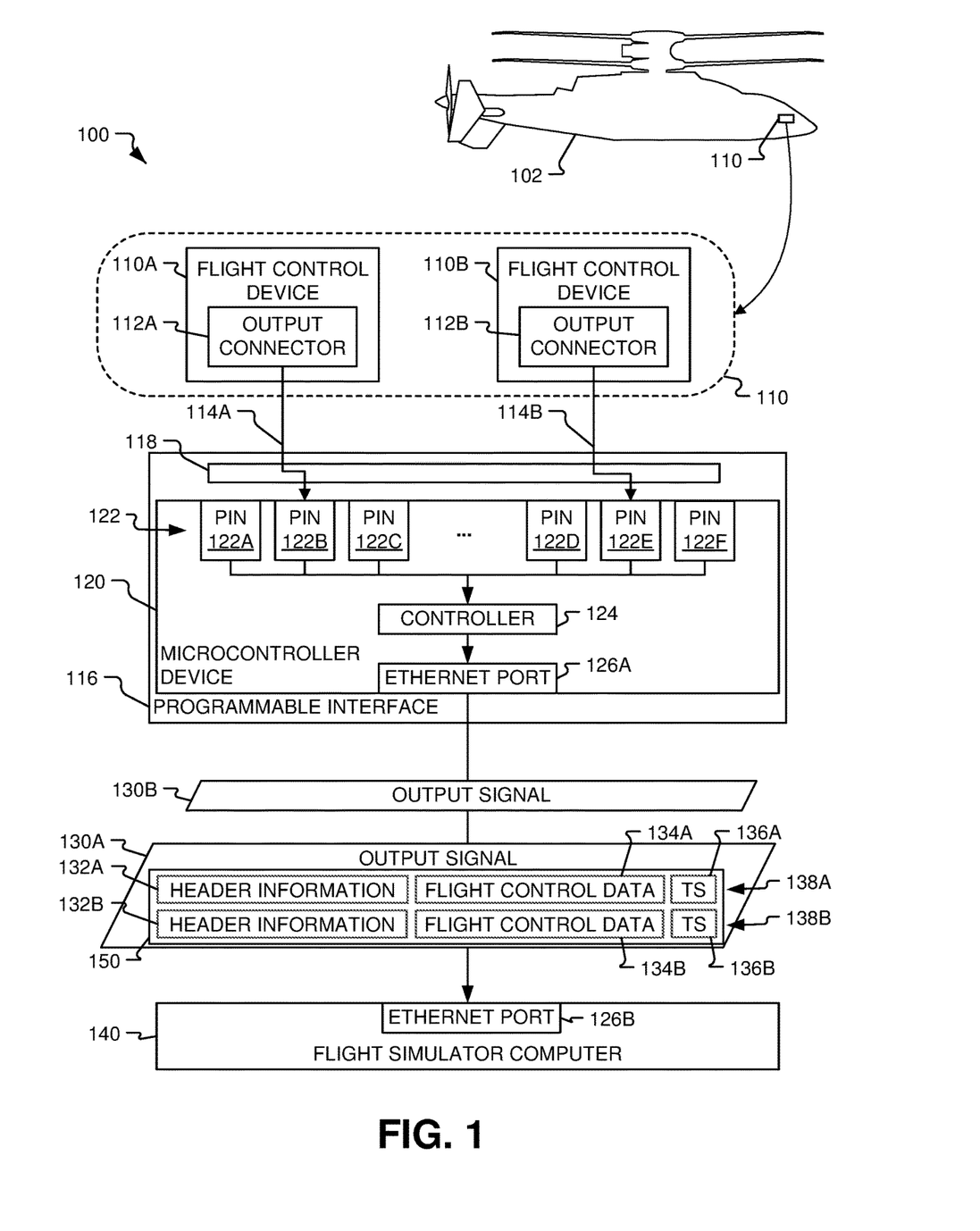
FIG. 1 is a diagram that illustrates a particular implementation of a system that includes a programmable interface for flight control devices.

FIG. 1 depicts an example of a rotorcraft flight simulator system 100 that includes a programmable interface 116 coupled to one or more physical flight control devices 110 for a rotorcraft vehicle 102 (e.g., a helicopter or a tilt-rotor aircraft) and to a flight simulator computer 140. The programmable interface 116 is configured to convert signals received from the physical flight control devices 110 into output signals 130 having a format compatible for use with the flight simulator computer 140. According to an aspect, the programmable interface 116 includes a programmable microcontroller device 120, such as an ARDUINO Mega 2560—type device (ARDUINO is a trademark of ARDUINO SA SOCIETE ANONYME (SA) SWITZERLAND).

As illustrated, the flight control devices 110 include a first flight control device 110A and a second flight control device 110B, each of which is a physical device that matches (or substantially matches) an actual flight control device used in the rotorcraft vehicle 102. According to some aspects, the flight control devices 110 include one or more of a cyclic control device, a collective control device, a throttle control device, or a side stick control device, as described further with reference to FIG. 2.

Each of the flight control devices 110 includes a respective output connector 112 and is configured to generate, when actuated, one or more control signals 114 via the output connector 112 of that flight control device 110. As illustrated, the first flight control device 110A includes a first output connector 112A configured to generate a first control signal 114A, and a second flight control device 110B includes a second output connector 112B configured to generate a second control signal 114B. Each of the control signals 114 may correspond to a discrete signal or an analog signal. In the examples described herein, the first control signal 114A is a discrete signal and the second control signal 114B is an analog signal.

To illustrate, a discrete signal can be a two-state voltage or current signal, such as a first voltage signal (e.g., 5 volts (5V)) to indicate that a two-state device (e.g., a rocker switch, push button, etc.) of the first flight control device 110A has a first state (e.g., a rocker switch in a first position) and a second voltage signal (e.g., 0V) to indicate that the two-state device has a second state (e.g., the rocker switch in a second position). In a particular implementation, the first flight control device 110A can correspond to a pilot trim four-way hat switch, and the first control signal 114A can indicate whether the switch is actuated in a leftward direction, indicating "pilot trim roll left." An analog signal can be a variable current or voltage that can vary continuously (or can have three or more quantized output values). For example, the second flight control device 110B can correspond to an analog proportional thumbwheel (e.g., a spring return-to-center, single axis thumbwheel actuator) that provides the second control signal 114B as an analog voltage value based on the position of the thumbwheel (e.g., the thumbwheel's directional distance from a center position). To illustrate, in a particular implementation, the second control signal 114B can vary linearly from 4.5V, representing full positive travel of the thumbwheel, to 0.5V, representing full negative travel of the thumbwheel.

Although the first flight control device 110A and the second flight control device 110B are each illustrated as coupled to a single respective input pin 122 of multiple input pins 122 of the microcontroller device 120 for ease of illustration, it should be understood that each of the flight control devices 110 can be coupled to the microcontroller device 120 via multiple pins. For example, an output connector 112 of a flight control device 110 may be coupled to a supply pin (e.g., a 3.3V or 5V supply of the microcontroller device 120), a ground pin, and one or more signal input pins, such as a digital input/output (I/O) pin to receive a discrete control signal 114, or an analog pin to receive an analog control signal. In one illustrative implementation, the second flight control device 110B corresponds to an analog proportional thumbwheel having two supply (Vcc) terminals, two ground (GND) terminals, and two analog output terminals, such as an OTTO® HTWM—Hall Effect Mini Proportional Output Thumbwheel (OTTO® is a registered trademark of OTTO ENGINEERING, INC., Carpentersville, IL), resulting in up to six individual pin connections to the microcontroller device 120 for the single actuator.

The programmable interface 116 includes input circuitry 118 coupled to the microcontroller device 120. The microcontroller device 120 includes a controller 124 that is coupled to multiple input pins 122 and to an Ethernet port 126A. Each of the output connectors 112 of the flight control devices 110 is coupled, via the input circuitry 118, to one or more respective input pins 122 of the multiple input pins 122 and configured to communicate the respective control signals 114 from the flight control devices 110 to the respective input pins 122.

The input circuitry 118 is configured to adjust the control signals 114 to comply with current specifications, voltage specifications, or both, of the input pins 122 of the microcontroller device 120. In an example, the input circuitry 118 includes voltage limiting circuitry, current limiting circuitry, or both, based on input and output voltage and current capabilities of the microcontroller device 120.

The controller 124 is configured to attribute particular control signals received at a particular input pin 122 of the multiple input pins 122 to a specific flight control device of the flight control devices 110. For example, the controller 124 is configured to attribute the particular control signals 114A received at the particular input pin 122B to the first flight control device 110A. As another example, the controller 124 is configured to attribute the particular control signals 114B received at the particular input pin 122E to the second flight control device 110B. In some implementations, the controller 124 includes or otherwise has access to mapping data that identifies, for each input pin 122 that receives a control signal 114, a particular flight control device 110 that is assigned to that input pin 122. In an example, the controller 124 periodically performs a read operation of each of the input pins 122, or each of a subset of the input pins 122, and for each input pin 122 for which an input value is obtained, the controller 124 performs a lookup operation for that input pin 122 to determine the corresponding flight control device 110 that provided the input value for that input pin 122.

The controller 124 is configured to generate output signals 130 that carry data representing input values received, via the input pins 122, from particular flight control devices 110. In an illustrative implementation, the controller 124 is configured to execute a software loop that includes: reading input values at the input pins 122; identifying the flight control device 110 associated with each of the input values; translating the input values into a form usable by the flight simulator computer 140; inserting the resulting data into an Ethernet packet, and providing the packet to the Ethernet port 126A for transmission as one or more output signals 130. In an example, one or more of the output signals 130 is generated for each iteration of the software loop. To illustrate, according to some aspects, a first iteration of the software loop generates a first output signal 130A that conveys data collected during the first iteration, and a second iteration of the software loop generates a second output signal 130B that conveys data collected during the second iteration.

The output signals 130 include one or more sets of information 138 associated with the control signals 114. The one or more sets of information 138 include a first set of information 138A associated with the first flight control device 110A and a second set of information 138B associated with the second flight control device 110B. To illustrate, the first set of information 138A for the specific flight control device 110A includes header information 132A indicating the specific flight control device 110A and flight control data 134A corresponding to a particular control signal 114A received at the particular input pin 122B that is associated with the specific flight control device 110A. In some implementations, the output signals 130 also include, in the first set of information 138A, a timestamp 136A indicating when the particular control signal 114A was received at (or read from) the particular input pin 122B. Similarly, the second set of information 138B includes header information 132B indicating the second flight control device 110B, flight control data 134B corresponding to one or more values of the second control signal 114B, and a timestamp 136B indicating when the second control signal 114B was received at (or read from) the input pin 122E.

The controller 124 is configured to output a packet 150 that includes the one or more sets of information 138 and that is transmitted by the Ethernet port 126A as the first output signal 130A. For example, the packet 150 can be formatted according to an Ethernet protocol and include a packet header and payload. The packet header can include header information, such as a destination address specifying the flight simulator computer 140 as an intended recipient of the packet 150, and the payload can include the sets of information 138.

The flight simulator computer 140 includes an Ethernet port 126B coupled to the Ethernet port 126A of the programmable interface 116 via a network. For example, the network can include one or more buses or wireline networks, one or more wireless networks, or a combination thereof, configured to enable transport of the output signals 130 (e.g., the packet 150) from the Ethernet port 126A to the Ethernet port 126B. The flight simulator computer 140 is configured to receive the output signals 130 from the controller 124 via the Ethernet port 126B.

The flight simulator computer 140 is configured to process the output signals 130 and to control simulation of flight associated with the flight control devices 110. To illustrate, in some implementations the flight simulator computer 140 coordinates among multiple simulation processes, including simulation processes executing at the flight simulator computer 140, as well as simulation processes executed on one or more remote processing system, such as a dedicated processing system for a simulation display system (e.g., an OTW display system that graphically simulates the outside world for a pilot, a head-down display system, etc.). The flight simulator computer 140 can include a math model that processes various inputs, such as, for example, flight control inputs and wind, to compute various outputs and/or aircraft parameters, such as aircraft position and attitude (e.g., pitch, roll, and yaw) that represent the dynamics of the rotorcraft vehicle 102 in simulated flight.

Although FIG. 1 illustrates the programmable interface 116 sending the output signals 130 to the flight simulator computer 140, in other implementations the programmable interface 116 sends the output signals 130 to one or more other components of a flight simulation system or avionics test bench. In an example, the flight simulator computer 140 is configured to send one or more of the output signals 130 to avionics hardware instead of, or in addition to, the flight simulator computer 140, such as described further with reference to FIG. 2.

During operation, the fight control devices 110 receive flight control input from a pilot or user of the rotorcraft flight simulator system 100. Flight control input may include, for example, pitch, roll, and yaw commands provided via actuation of one or more of the flight control devices 110. The flight control devices 110 transmit corresponding control signals 114 to the programmable interface 116, where they are provided to respective input pins 122 of the microcontroller device 120.

The microcontroller device 120 scans one or more of the input pins 122 for received control signals 114. For each received control signal 114, the controller 124 maps that signal to the flight control device 110 that generated the control signal 114 and generates an information set 138 for that control signal, including header information 132 indicating the flight control device 110, flight control data 134 that represents the received control signal 114 in a designated format for the flight simulator computer 140, and a timestamp 136 that indicates when the control signal 114 was received at, or scanned from, the input pin 122.

In some examples, the controller 124 translates a "HI" (e.g., 5V) or "LO" (e.g., 0V) voltage received at a discrete input pin, such as the input pin 122B, into an "on" or "off" indicator that is included in the flight control data 134 for the flight simulator computer 140. To illustrate, in an implementation in which the first flight control device 110A corresponds to a pilot trim four-way hat switch, the controller 124 may translate a "HI" value of the first control signal 114A into a "pilot trim roll left" indicator or message in the flight control data 134B. In an implementation in which the second flight control device 110B corresponds to a thumbwheel, the microcontroller device 120 may perform an analog-to-digital conversion at an analog-to-digital converter (ADC) to quantize a value of second control signal 114B into a multi-bit value (e.g., 10-bit quantization into 1,024 values). The multi-bit value may be translated into a format expected by the flight simulator computer 140, such as by interpolating a 10-bit value provided by the ADC into a 13-bit value for input to the flight simulator computer 140.

The microcontroller device 120 packages the resulting information sets 138 into a packet 150, and transmits the packet 150, via the Ethernet port 126A, to the flight simulator computer 140. The flight simulator computer 140 extracts the information sets 138 from the packet 150 and feeds the extracted data into the math model, which updates simulation outputs and aircraft parameters to cause the flight simulator system 100 to simulate responsiveness to the pilot's inputs to the flight control devices 110.

The microcontroller device 120 can be implemented at least in part by a processor (e.g., the controller 124) executing instructions to perform the described functions. The processor can be implemented as a single processor or as multiple processors, such as in a multi-core configuration, a multi-processor configuration, a distributed computing configuration, a cloud computing configuration, or any combination thereof. In some implementations, one or more portions of the programmable interface 116, the microcontroller device 120, the controller 124, or a combination thereof, are implemented using dedicated hardware, firmware, or a combination thereof.

Because the microcontroller device 120 can perform pin-to-flight-control-device mappings and control signal translations based on programmable settings, the microcontroller device 120 can be efficiently updated to accommodate various types of flight control devices 110. For example, the microcontroller device 120 can use a first pin-to-flight-control-device mapping to identify inputs from specific flight control devices that are used in a first type of rotorcraft, such as the flight controls of an H-47 CHINOOK helicopter, and may be updated to use a second pin-to-flight-control-device mapping to identify inputs from specific flight control devices that are used in a second type of rotorcraft, such as an AH-64 APACHE helicopter (CHINOOK is a trademark of DEPARTMENT OF THE ARMY, AH-64 APACHE is a trademark of THE BOEING COMPANY, SEATTLE, WA). Similarly, first control signal translation data to translate control signals received from the CHINOOK flight controls can be swapped with second control signal translation data to translate control signals received from the AH-64 APACHE flight controls.

As a result, individual flight control devices, or entire sets of flight control devices, can be quickly and inexpensively coupled to the flight simulator computer 140 by updating mapping and translation data used by the microcontroller device 120, reprogramming the microcontroller device 120, or a combination thereof, or alternatively by replacing the microcontroller device 120. The ability to quickly and inexpensively couple a variety of different flight control devices 110 to the flight simulator computer 140 enables relatively low cost and efficient rapid prototyping and also improves the flexibility of the rotorcraft flight simulator system 100 to simulate a variety of rotorcraft types.

Although the rotorcraft flight simulator system 100 is illustrated as including two flight control devices 110, in other implementations the programmable interface 116 may be coupled to a single flight control device 110 or more than two flight control devices 110. Although six input pins 122 of the microcontroller device 120 are illustrated, it should be understood that the microcontroller device 120 may have any number of input pins 122. For example, in some configurations an ARDUINO Mega board can include 54 discrete I/O input pins and 16 analog input pins, and multiple boards can be coupled together to increase a total number of available pins. Although the input pins 122 are described as being either analog input pins or discrete input pins, in some implementations analog input pins can be used for discrete input signals. In addition, in some implementations, the input circuitry 118 can include one or more ADCs that output a multi-bit value to multiple discrete pins to enable some (or all) analog control signals 114 to be received via discrete input pins of the microcontroller device 120.

Although the programmable interface 116 is illustrated as including the input circuitry 118, in some implementations the input circuitry 118 can be omitted, such as when control signals 114 generated by the flight control devices 110 satisfy input voltage and current criteria of the microcontroller device 120. Although the microcontroller device 120 is illustrated as including the Ethernet port 126A, in other implementations one or more other types of ports, bus interfaces, or network connectors may be implemented instead of, or in addition to, the Ethernet port 126A. For example, one or more of the output signals 130 may be transmitted via any other type of wireline or wireless signaling, such as an Institute of Electrical and Electronics Engineers (IEEE) 802.11 (e.g., Wi-Fi)-type wireless network, one or more serial buses or parallel buses, or a combination thereof, as illustrative, non-limiting examples.

Although the rotorcraft flight simulator system 100 is described as including flight control devices 110 for a rotorcraft vehicle 102, in other implementations the programmable interface 116 may be used in conjunction with flight control devices 110 for any other type of aircraft. In such a system, the flight simulator computer 140 may be configured to process the flight control data 134 to simulate parameters and attitude of one or more different types of aircraft. Thus, techniques, devices, and systems disclosed herein are not limited to rotorcraft applications.

Figure 2:
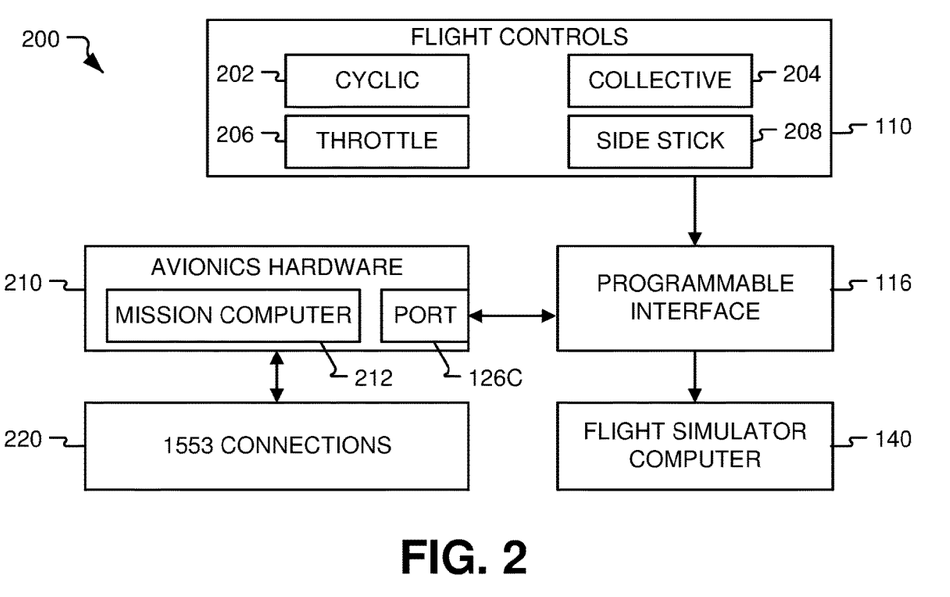
FIG. 2 is a diagram of another implementation of a system that includes a programmable interface for flight control devices.

FIG. 2 illustrates a system 200 that includes the flight control devices 110, the programmable interface 116, and the flight simulator computer 140 and also includes avionics hardware 210 coupled to one or more additional devices (not shown) via a set of connections 220 ("1553 connections") that are compliant with a MIL-STD-1553 serial data bus standard.

As illustrated, the flight control devices 110 include at least one of a cyclic control device 202, a collective control device 204, a throttle control device 206, or a side stick control device 208. Each of the flight control devices 110 includes its own connector (e.g., an output connector 112 of FIG. 1) that is coupled to the programmable interface 116. For example, the cyclic control device 202 or the side stick control device 208 may output, via a connector 112, one or more voltage ranges representing pitch and roll, the throttle control device 206 may output an analog voltage range representing a power setting, and various buttons or switches may provide respective discrete control signals to the programmable interface 116 via their respective output connectors.

The avionics hardware 210 includes a mission computer 212 and is configured to receive one or more of the output signals 130 (e.g., from the Ethernet port 126A of the programmable interface 116) via an Ethernet port 126C of the avionics hardware 210. For example, the programmable interface 116 (e.g., the microcontroller device 120) can be configured to format control signal data from the flight control devices 110 into a format usable by the avionics hardware 210 during generation of output signals 130 for the avionics hardware 210.

The set of connections 220 are depicted as examples of data paths via which the control signal data, other flight related data, or both, can be distributed to one or more other components of a flight simulator system or avionics test bench. In some implementations, data from one or more components may be transmitted to the avionics hardware 210 via the set of connections 220, formatted by the avionics hardware (e.g., the mission computer 212) into a usable format for the flight simulator computer 140, and transmitted, via the Ethernet port 126C, to the programmable interface 116 to be relayed to the flight simulator computer 140. Although the set of connections 220 are illustrated as 1553 connections, in other implementations the set of connections 220 can include one or more other types of connections (e.g., ARINC-type connections) that are supported by the avionics hardware 210.

Figure 3:
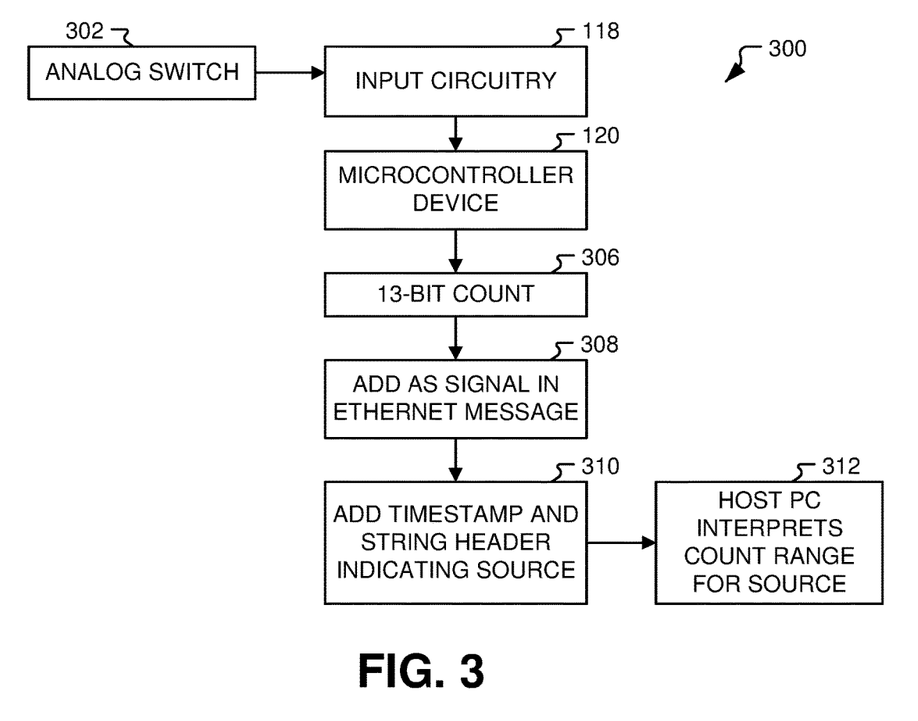
FIG. 3 is a diagram that illustrates a first example of operations that may be performed by the system of FIG. 1 or the system of FIG. 2.

FIG. 3 illustrates an example of operations 300 associated with processing analog signals from a flight control device that may be performed in the rotorcraft flight simulator system 100 of FIG. 1 or the system 200 of FIG. 2. As illustrated, an analog switch 302 outputs a control signal (e.g., the second control signal 114B) that is received at the input circuitry 118, where the control signal may be modified, such as to satisfy current or voltage input criteria for the microcontroller device 120.

The microcontroller device 120 performs an analog-to-digital conversion of the control signal received from the input circuitry 118 and generates a data word that represents the analog value of the control signal, illustrated as a 13-bit count 306. For example, the microcontroller device 120 may include a 13-bit ADC coupled to an analog input pin that receives the control signal. As another example, the microcontroller device 120 may include an ADC having a different resolution (e.g., less than 13 bits, or greater than 13 bits), and the microcontroller device 120 may estimate (e.g., interpolate or truncate) a 13-bit value based on the ADC output. To illustrate, in an implementation in which the microcontroller device 120 uses a 10-bit ADC, the microcontroller device 120 may append three low-order "0" bits to the output of the ADC to generate the 13-bit count 306. In some implementations, the 13-bit size of the count 306 to represent the control signal from the analog switch 302 is selected in accordance with a data format that is expected by the flight simulator computer 140 for the analog switch 302. In other implementations, the count 306 may be represented by fewer than 13 bits or more than 13 bits.

At block 308, the 13-bit count 306 is added as a signal in an Ethernet message. For example, the 13-bit count 306 may correspond to the flight control data 134B of FIG. 1. At block 310, a timestamp and string header indicating the source of the control signal are added to the Ethernet message. For example, the microcontroller device 120 adds an identifier of the analog switch 302 (e.g., a textual descriptor) to the packet 150 as the header information 132B and adds the timestamp to the packet 150 as the timestamp 136B.

The Ethernet message including the 13-bit count 306, the timestamp, and the string header are received at a flight simulator host computer ("host PC"), such as the flight simulator computer 140. The host PC interprets the count range (e.g., the 13-bit count 306) for the source (e.g., the analog switch 302), at block 312. For example, the host PC can use the 13-bit count 306 as a digital representation of the control signal that is output by the analog switch 302. In other examples, the host PC may perform additional processing of the 13-bit count 306, such as by applying a scaling factor, offset, or other transformation prior to using the 13-bit count 306 in a flight simulation model.

Figure 4:
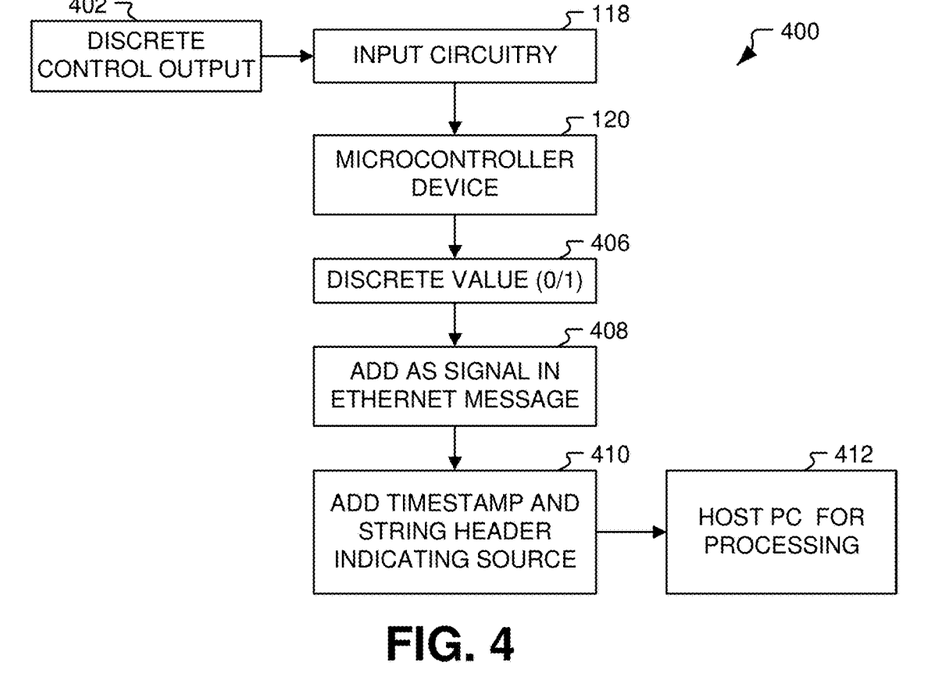
FIG. 4 is a diagram that illustrates a second example of operations that may be performed by the system of FIG. 1 or the system of FIG. 2.

FIG. 4 illustrates an example of operations 400 associated with processing discrete signals from a flight control device that may be performed in the rotorcraft flight simulator system 100 of FIG. 1 or the system 200 of FIG. 2. A discrete control output 402 (e.g., a discrete control signal 114A output by a pilot trim switch) is received at the input circuitry 118. The input circuitry 118 may modify the discrete control output, such as to satisfy current or voltage input criteria for the microcontroller device 120.

The microcontroller device 120 determines a discrete value 406 of the discrete control output 402 received from the input circuitry 118, such as a "0" or "1" value. At block 408, the discrete value 406 is added as a signal in an Ethernet message. For example, the discrete value may correspond to the flight control data 134A of FIG. 1. At block 410, a timestamp and string header indicating the source of the discrete control output 402 are added to the Ethernet message. For example, the microcontroller device 120 adds an identifier of the control that generated the discrete control output 402 (e.g., a textual descriptor, such as "pilot trim roll left") to the packet 150 as the header information 132A and adds the timestamp to the packet 150 as the timestamp 136A.

The Ethernet message including the discrete value 406, the timestamp, and the string header are received at a flight simulator host computer ("host PC"), such as the flight simulator computer 140, at block 412. The host PC performs processing using the discrete value 406 in a flight simulation model.

Figure 5:
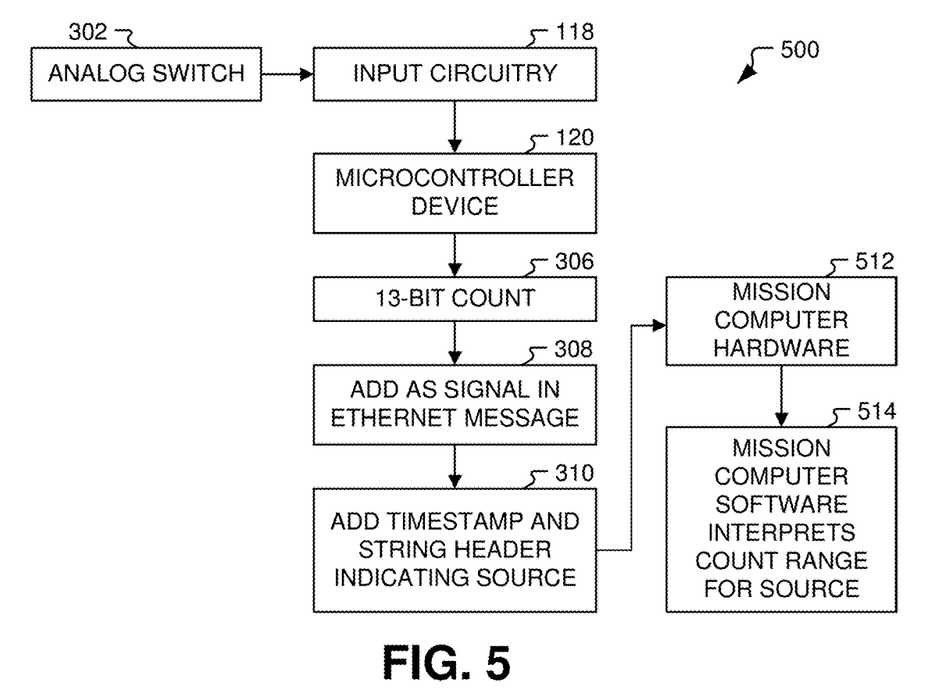
FIG. 5 is a diagram that illustrates a third example of operations that may be performed by the system of FIG. 2.

FIG. 5 illustrates an example of operations 500 associated with processing analog signals from a flight control device that may be performed in the system 200 of FIG. 2. As described previously in FIG. 3, the analog switch 302 outputs a control signal that is received at the input circuitry 118 and provided to the microcontroller device 120, which generates the 13-bit count 306 that is added as a signal in an Ethernet message, at block 308, and a timestamp and string header indicating the source of the control signal (e.g., the analog switch 302) are also added to the Ethernet message, at block 310.

The Ethernet message including the 13-bit count 306, the timestamp, and the string header are received at mission computer hardware 512, such as the avionics hardware 210. At block 514, mission computer software interprets the count range (e.g., the 13-bit count 306) for the source (e.g., the analog switch 302). For example, the mission computer 212 can use the 13-bit count 306 as a digital representation of the control signal that is output by the analog switch 302. In other examples, the avionics hardware 210, the mission computer 212, or both, may perform additional processing of the 13-bit count 306, such as to apply a scaling factor, offset, or other transformation prior to using the 13-bit count.

Figure 6:
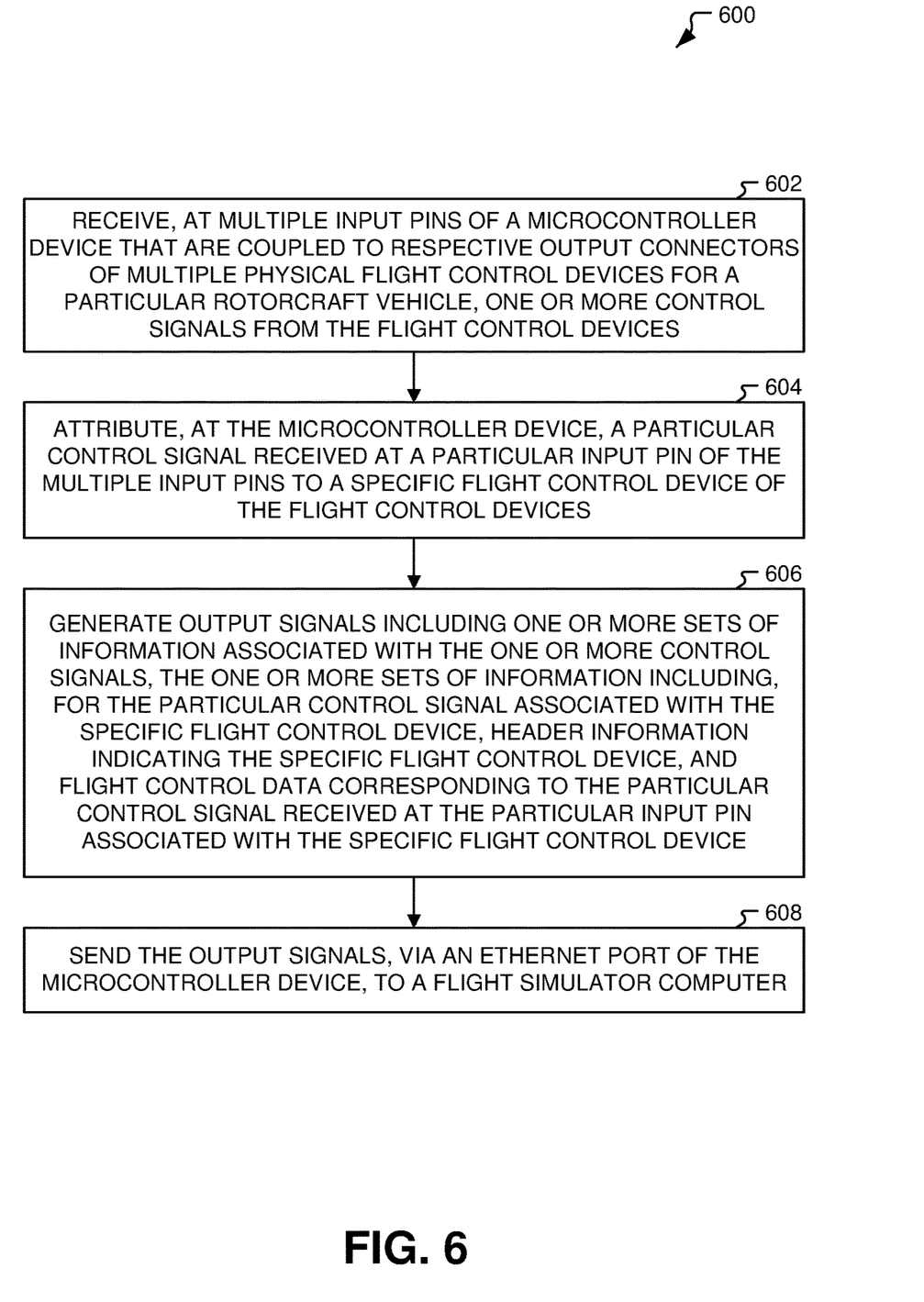
FIG. 6 is a diagram that illustrates a flow chart of an example of a method that may be performed by the system of FIG. 1 or FIG. 2.

FIG. 6 illustrates an example of a method 600 of using a rotorcraft flight simulator system, such as the flight simulator system 100. The method 600 can be performed at a microcontroller device, such as the microcontroller device 120.

The method 600 includes, at block 602, receiving, at multiple input pins of the microcontroller device that are coupled to respective output connectors of multiple physical flight control devices for a particular rotorcraft vehicle, one or more control signals from the flight control devices. For example, the control signals 114 from the flight control devices 110 are received (e.g., via the input circuitry 118) at the input pins 122. According to an aspect, the one or more control signals include digital signals from a first flight control device and analog signals from a second flight control device, such as the digital control signals 114A from the first flight control device 110A and the analog control signals 114B from the second flight control device 110B. In some implementations, the flight control devices include at least one of a cyclic control device, a collective control device, a throttle control device, or a side stick control device, such as the cyclic control device 202, the collective control device 204, the throttle control device 206, or the side stick control device 208 depicted in FIG. 2.

The method 600 includes, at block 604, attributing, at the microcontroller device, a particular control signal received at a particular input pin of the multiple input pins to a specific flight control device of the flight control devices. For example, the controller 124 attributes the control signal 114A received at the input pin 122B to the first flight control device 110A.

The method 600 includes, at block 606, generating output signals including one or more sets of information associated with the one or more control signals. The one or more sets of information include, for the particular control signal associated with the specific flight control device, header information indicating the specific flight control device and flight control data corresponding to the particular control signal received at the particular input pin associated with the specific flight control device. In some implementations, the output signals further include a timestamp of the particular control signal received at the particular input pin. For example, the controller 124 generates the output signals 130 including the set of information 138A, which includes the header information 132A indicating the first flight control device 110A, the flight control data 134A corresponding to the control signal 114A, and the timestamp 136A.

The method 600 includes, at block 608, sending the output signals, via an Ethernet port of the microcontroller device, to a flight simulator computer. For example, the microcontroller device 120 sends the output signals 130, via the Ethernet port 126A, to the flight simulator computer 140. In some implementations, generating the output signals includes generating a packet that includes at least a first set of header information and flight control data associated with a first flight control device and a second set of header information and flight control data associated with a second flight control device, such as the packet 150. According to an aspect, sending the output signals includes transmitting the packet. In some implementations, the method 600 includes sending the output signals, via the Ethernet port, to a mission computer, such as the mission computer 212.

Figure 7:
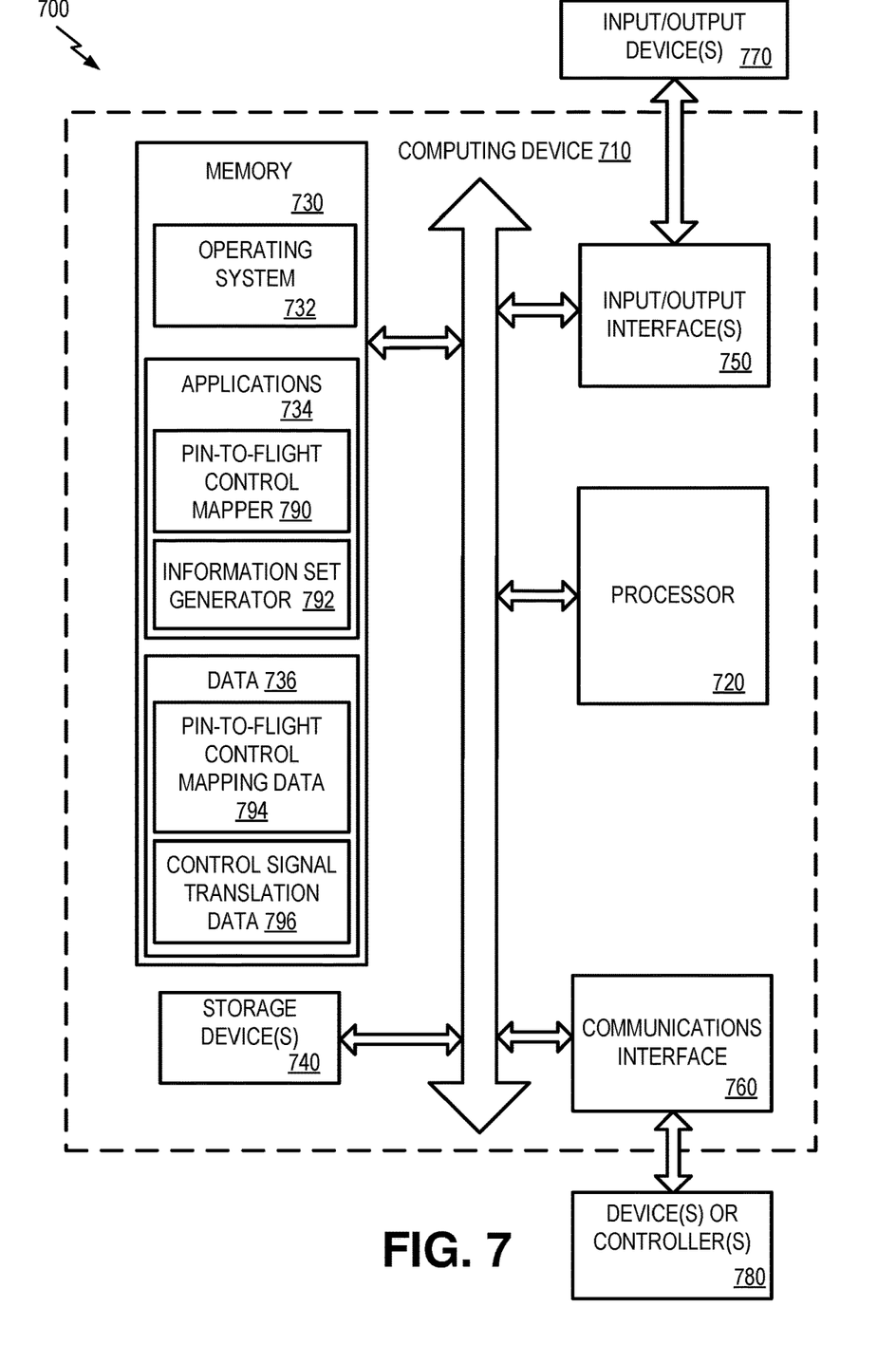
FIG. 7 is a block diagram of a computing environment including a computing device configured to support aspects of computer-implemented methods and computer-executable program instructions (or code) according to the present disclosure.

FIG. 7 is a block diagram of a computing environment 700 including a computing device 710 configured to support aspects of computer-implemented methods and computer-executable program instructions (or code) according to the present disclosure. For example, the computing device 710, or portions thereof, is configured to execute instructions to initiate, perform, or control one or more operations described with reference to FIGS. 1-6. In some implementations, the computing device 710 includes components of the microcontroller device 120. For example, the computing environment 700 can correspond to the rotorcraft flight simulator system 100 of FIG. 1.

The computing device 710 includes one or more processors 720. The processor(s) 720 are configured to communicate with system memory 730, one or more storage devices 740, one or more input/output interfaces 750, one or more communications interfaces 760, or any combination thereof. The system memory 730 includes volatile memory devices (e.g., random access memory (RAM) devices), nonvolatile memory devices (e.g., read-only memory (ROM) devices, programmable read-only memory, and flash memory), or both. The system memory 730 stores an operating system 732, which may include a basic input/output system for booting the computing device 710 as well as a full operating system to enable the computing device 710 to interact with users, other programs, and other devices. The system memory 730 stores data 736, such as pin-to-flight-control mapping data 794 that maps signals received on input pins to flight controls, such as a table that maps the input pin 122B to the first flight control device 110A and maps the pin 122E to the second flight control device 110B. The stored data 736 also includes control signal translation data 796 that can be used to convert control signals received from flight controls to flight control data having an appropriate format for a receiving device, such as the flight simulator computer 140, the avionics hardware 210 (e.g., the mission computer 212), or both.

The system memory 730 includes one or more applications 734 (e.g., sets of instructions) executable by the processor(s) 720. As an example, the one or more applications 734 include instructions executable by the processor(s) 720 to initiate, control, or perform one or more operations described with reference to FIGS. 1-6. To illustrate, the one or more applications 734 include instructions executable by the processor(s) 720 to initiate, control, or perform one or more operations described with reference to the microcontroller device 120, such as a pin-to-flight-control mapper 790 that is executable to use the pin-to-flight-control mapping data 794 to associate control data received via a specific pin or pins to specific flight control devices, an information set generator 792 that is executable to generate the information sets 138 based on received control signals and the control signal translation data 796, or a combination thereof.

In a particular implementation, the system memory 730 includes a non-transitory, computer-readable medium storing the instructions that, when executed by the processor(s) 720, cause the processor(s) 720 to initiate, perform, or control operations to operate an interface for flight control devices of a rotorcraft flight simulator system. The operations include receiving, at multiple input pins of a microcontroller device that are coupled to respective output connectors of multiple physical flight control devices for a particular rotorcraft vehicle, one or more control signals from the flight control devices. The operations include attributing, at the microcontroller device, a particular control signal received at a particular input pin of the multiple input pins to a specific flight control device of the flight control devices, and generating output signals including one or more sets of information associated with the one or more control signals. The one or more sets of information include, for the particular control signal associated with the specific flight control device, header information indicating the specific flight control device, and flight control data corresponding to the particular control signal received at the particular input pin associated with the specific flight control device. The operations also include sending the output signals, via an Ethernet port of the microcontroller device, to a flight simulator computer.

The one or more storage devices 740 include nonvolatile storage devices, such as magnetic disks, optical disks, or flash memory devices. In a particular example, the storage devices 740 include both removable and non-removable memory devices. The storage devices 740 are configured to store an operating system, images of operating systems, applications (e.g., one or more of the applications 734), and program data (e.g., the program data 736). In a particular aspect, the system memory 730, the storage devices 740, or both, include tangible computer-readable media. In a particular aspect, one or more of the storage devices 740 are external to the computing device 710.

The one or more input/output interfaces 750 enable the computing device 710 to communicate with one or more input/output devices 770 to facilitate user interaction. For example, the one or more input/output interfaces 750 can include the input circuitry 118, the input pins 122, or both, and the input/output devices 770 can include one or more of the flight control devices 110. As other examples, the one or more input/output interfaces 750 can include a display interface, an input interface, or a combination thereof. The processor(s) 720 are configured to communicate with devices or controllers 780 via the one or more communications interfaces 760. For example, the one or more communications interfaces 760 can include a network interface, such as the Ethernet port 126A. The devices or controllers 780 can include, for example, the flight simulator computer 140, the avionics hardware 210 (e.g., the mission computer 212), one or more other devices, or any combination thereof.

In conjunction with the described systems and methods, an apparatus for use with a rotorcraft flight simulator system is disclosed that includes means for receiving one or more control signals from one or more physical flight control devices, the means for receiving coupled to a respective output connector of each of the one or more flight control devices. In some implementations, the means for receiving one or more control signals corresponds to the input circuitry 118, one or more of the input pins 122, the microcontroller device 120, the programmable interface 116, the input/output interface 750, the computing device 710, one or more other circuits or devices configured to receive one or more control signals from one or more physical flight control devices, or a combination thereof.

The apparatus includes means for attributing a particular control signal received at the means for receiving to a specific flight control device of the one or more flight control devices. For example, the means for attributing a particular control signal to a specific flight control device can correspond to the controller 124, the microcontroller device 120, the programmable interface 116, the computing device 710, the processor(s) 720, one or more other devices configured to attribute a particular control signal received at the means for receiving to a specific flight control device, or a combination thereof.

The apparatus includes means for generating output signals including one or more sets of information associated with the one or more control signals, the one or more sets of information including, for the particular control signal associated with the specific flight control device: header information indicating the specific flight control device, and flight control data corresponding to the particular control signal received at the particular input pin associated with the specific flight control device. In some implementations, the means for generating output signals corresponds to the controller 124, the microcontroller device 120, the programmable interface 116, the Ethernet port 126A, the computing device 710, the processor(s) 720, the communications interface 760, one or more other circuits or devices configured to generate output signals including one or more sets of information associated with the one or more control signals, or a combination thereof.

The apparatus also includes means for sending the output signals to a flight simulator computer. For example, the means for sending can correspond to the controller 124, the microcontroller device 120, the programmable interface 116, the Ethernet port 126A, the computing device 710, the processor(s) 720, the communications interface 760, one or more other circuits or devices configured to send the output signals to a flight simulator computer, or a combination thereof.

In some implementations, a non-transitory, computer-readable medium stores instructions that, when executed by one or more processors, cause the one or more processors to initiate, perform, or control operations to perform part or all of the functionality described above. For example, the instructions may be executable to implement one or more of the operations or methods of FIGS. 1-6. To illustrate, the instructions of the applications 734, when executed by the processor(s) 720, can cause the processor(s) 720 to initiate, perform, or control to operate an interface for flight control devices of a rotorcraft flight simulator system. The operations include receiving, at multiple input pins of a microcontroller device that are coupled to respective output connectors of multiple physical flight control devices for a particular rotorcraft vehicle, one or more control signals from the flight control devices. The operations include attributing, at the microcontroller device, a particular control signal received at a particular input pin of the multiple input pins to a specific flight control device of the flight control devices, and generating output signals including one or more sets of information associated with the one or more control signals. The one or more sets of information include, for the particular control signal associated with the specific flight control device, header information indicating the specific flight control device, and flight control data corresponding to the particular control signal received at the particular input pin associated with the specific flight control device. The operations also include sending the output signals, via an Ethernet port of the microcontroller device, to a flight simulator computer. In some implementations, part or all of one or more of the operations or methods of FIGS. 1-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Further, the disclosure comprises embodiments according to the following examples:

According to Example 1, a rotorcraft flight simulator system includes: physical flight control devices for a rotorcraft vehicle, each of the physical flight control devices including a respective output connector and configured to generate, when actuated, one or more control signals via the output connector of that flight control device; a programmable interface including: multiple input pins, each of the output connectors of the flight control devices coupled to a respective input pin of the multiple input pins to communicate the respective control signals from the flight control devices to the respective input pins; and a controller configured to attribute particular control signals received at a particular input pin of the multiple input pins to a specific flight control device of the flight control devices; and a flight simulator computer configured to receive output signals from the controller via an Ethernet port, wherein the output signals include one or more sets of information associated with the control signals, the one or more sets of information including, for the specific flight control device: header information indicating the specific flight control device; and flight control data corresponding to a particular control signal received at the particular input pin, of the multiple input pins, that is associated with the specific flight control device.

Example 2. The rotorcraft flight simulator system of Example 1, wherein the flight control devices include at least one of a cyclic control device, a collective control device, a throttle control device, or a side stick control device.

Example 3. The rotorcraft flight simulator system of Example 1 or Example 2, wherein the control signals include digital signals from a first flight control device and analog signals from a second flight control device.

Example 4. The rotorcraft flight simulator system of any of Examples 1 to 3, wherein the output signals further include a timestamp of the particular control signal received at the particular input pin.

Example 5. The rotorcraft flight simulator system of any of Examples 1 to 4, wherein the controller is configured to output a packet that includes the one or more sets of information, the one or more sets of information including at least a first set of header information and flight control data associated with a first flight control device and a second set of header information and flight control data associated with a second flight control device.

Example 6. The rotorcraft flight simulator system of any of Examples 1 to 5, further including avionics hardware configured to receive the output signals via a second Ethernet port.

Example 7. The rotorcraft flight simulator system of Example 6, wherein the avionics hardware includes a mission computer.

Example 8. The rotorcraft flight simulator system of any of Examples 1 to 7, wherein the programmable interface includes a programmable microcontroller device.

According to Example 9, a microcontroller device includes: multiple input pins configured to be coupled to respective output connectors, of multiple physical flight control devices for a particular rotorcraft vehicle, to receive one or more control signals from the flight control devices at respective input pins; an Ethernet port; and a controller configured to: attribute particular control signals received at a particular input pin of the multiple input pins to a specific flight control device of the flight control devices; generate output signals including one or more sets of information associated with the one or more control signals, the one or more sets of information including, for the particular control signals associated with the specific flight control device: header information indicating the specific flight control device; and flight control data corresponding to a particular control signal received at the particular input pin, of the multiple input pins, that is associated with the specific flight control device; and output the output signals via the Ethernet port.

Example 10. The microcontroller device of Example 9, wherein the flight control devices include at least one of a cyclic control device, a collective control device, a throttle control device, or a side stick control device.

Example 11. The microcontroller device of Example 9 or Example 10, wherein the one or more control signals include digital signals from a first flight control device and analog signals from a second flight control device.

Example 12. The microcontroller device of any of Examples 9 to 11, wherein the output signals further include a timestamp of the particular control signal received at the particular input pin.

Example 13. The microcontroller device of any of Examples 1 to 12, wherein the controller is configured to output, via the Ethernet port, a packet that includes the one or more sets of information, the one or more sets of information including at least a first set of header information and flight control data associated with a first flight control device and a second set of header information and flight control data associated with a second flight control device.

According to Example 14, a method of using a rotorcraft flight simulator system includes: receiving, at multiple input pins of a microcontroller device that are coupled to respective output connectors of multiple physical flight control devices for a particular rotorcraft vehicle, one or more control signals from the flight control devices; attributing, at the microcontroller device, a particular control signal received at a particular input pin of the multiple input pins to a specific flight control device of the flight control devices; generating output signals including one or more sets of information associated with the one or more control signals, the one or more sets of information including, for the particular control signal associated with the specific flight control device: header information indicating the specific flight control device; and flight control data corresponding to the particular control signal received at the particular input pin associated with the specific flight control device; and sending the output signals, via an Ethernet port of the microcontroller device, to a flight simulator computer.

Example 15. The method of Example 14, wherein the flight control devices include at least one of a cyclic control device, a collective control device, a throttle control device, or a side stick control device.

Example 16. The method of Example 14 or Example 15, wherein the one or more control signals include digital signals from a first flight control device and analog signals from a second flight control device.

Example 17. The method of any of Examples 14 to 16, wherein the output signals further include a timestamp of the particular control signal received at the particular input pin.

Example 18. The method of any of Examples 14 to 17, wherein generating the output signals includes generating a packet that includes at least a first set of header information and flight control data associated with a first flight control device and a second set of header information and flight control data associated with a second flight control device.

Example 19. The method of Example 18, wherein sending the output signals includes transmitting the packet.

Example 20. The method of any of Examples 14 to 19, further including sending the output signals, via the Ethernet port, to a mission computer.

According to Example 21, an apparatus includes means for performing the method of any of Examples 14 to 20.

According to Example 22, a device includes a memory configured to store instructions; and a processor configured to execute the instructions to perform the method of any of Examples 14 to 20.

According to Example 23, a computer readable storage medium stores instructions that, when executed by one or more processors, cause the one or more processors to perform the method of any of Examples 14 to 20.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A rotorcraft flight simulator system, comprising:
    physical flight control devices for a rotorcraft vehicle, each of the physical flight control devices including a respective output connector and configured to generate, when actuated, one or more control signals via the output connector of that flight control device;
    a programmable interface including:
        multiple input pins, each of the output connectors of the flight control devices coupled to a respective input pin of the multiple input pins to communicate the respective control signals from the flight control devices to the respective input pins; and
        a controller configured to attribute particular control signals received at a particular input pin of the multiple input pins to a specific flight control device of the flight control devices; and
    a flight simulator computer configured to receive output signals from the controller via an Ethernet port, wherein the output signals include one or more sets of information associated with the control signals, the one or more sets of information including, for the specific flight control device:
        header information indicating the specific flight control device; and
        flight control data corresponding to a particular control signal received at the particular input pin, of the multiple input pins, that is associated with the specific flight control device.

2. The rotorcraft flight simulator system of claim 1, wherein the flight control devices include at least one of a cyclic control device, a collective control device, a throttle control device, or a side stick control device.

3. The rotorcraft flight simulator system of claim 1, wherein the control signals include digital signals from a first flight control device and analog signals from a second flight control device.

4. The rotorcraft flight simulator system of claim 1, wherein the output signals further include a timestamp of the particular control signal received at the particular input pin.

5. The rotorcraft flight simulator system of claim 1, wherein the controller is configured to output a packet that includes the one or more sets of information, the one or more sets of information including at least a first set of header information and flight control data associated with a first flight control device and a second set of header information and flight control data associated with a second flight control device.

6. The rotorcraft flight simulator system of claim 1, further comprising avionics hardware configured to receive the output signals via a second Ethernet port.

7. The rotorcraft flight simulator system of claim 6, wherein the avionics hardware includes a mission computer.

8. The rotorcraft flight simulator system of claim 1, wherein the programmable interface comprises a programmable microcontroller device.

9. A microcontroller device comprising:
    multiple input pins configured to be coupled to respective output connectors, of multiple physical flight control devices for a particular rotorcraft vehicle, to receive one or more control signals from the flight control devices at respective input pins;
    an Ethernet port; and
    a controller configured to:
        attribute particular control signals received at a particular input pin of the multiple input pins to a specific flight control device of the flight control devices;
        generate output signals including one or more sets of information associated with the one or more control signals, the one or more sets of information including, for the particular control signals associated with the specific flight control device:
            header information indicating the specific flight control device; and
            flight control data corresponding to a particular control signal received at the particular input pin, of the multiple input pins, that is associated with the specific flight control device; and
        output the output signals via the Ethernet port.

10. The microcontroller device of claim 9, wherein the flight control devices include at least one of a cyclic control device, a collective control device, a throttle control device, or a side stick control device.

11. The microcontroller device of claim 9, wherein the one or more control signals include digital signals from a first flight control device and analog signals from a second flight control device.

12. The microcontroller device of claim 9, wherein the output signals further include a timestamp of the particular control signal received at the particular input pin.

13. The microcontroller device of claim 12, wherein the controller is configured to output, via the Ethernet port, a packet that includes the one or more sets of information, the one or more sets of information including at least a first set of header information and flight control data associated with a first flight control device and a second set of header information and flight control data associated with a second flight control device.

14. A method of using a rotorcraft flight simulator system, comprising:
    receiving, at multiple input pins of a microcontroller device that are coupled to respective output connectors of multiple physical flight control devices for a particular rotorcraft vehicle, one or more control signals from the flight control devices;
    attributing, at the microcontroller device, a particular control signal received at a particular input pin of the multiple input pins to a specific flight control device of the flight control devices;
    generating output signals including one or more sets of information associated with the one or more control signals, the one or more sets of information including, for the particular control signal associated with the specific flight control device:
        header information indicating the specific flight control device; and
        flight control data corresponding to the particular control signal received at the particular input pin associated with the specific flight control device; and
    sending the output signals, via an Ethernet port of the microcontroller device, to a flight simulator computer.

15. The method of claim 14, wherein the flight control devices include at least one of a cyclic control device, a collective control device, a throttle control device, or a side stick control device.

16. The method of claim 14, wherein the one or more control signals include digital signals from a first flight control device and analog signals from a second flight control device.

17. The method of claim 14, wherein the output signals further include a timestamp of the particular control signal received at the particular input pin.

18. The method of claim 14, wherein generating the output signals includes generating a packet that includes at least a first set of header information and flight control data associated with a first flight control device and a second set of header information and flight control data associated with a second flight control device.

19. The method of claim 18, wherein sending the output signals includes transmitting the packet.

20. The method of claim 14, further comprising sending the output signals, via the Ethernet port, to a mission computer.

* * * * *